United States Patent [19]

Arisaka et al.

[11] 4,127,625
[45] Nov. 28, 1978

[54] PROCESS FOR PREPARING HOLLOW FIBER HAVING SELECTIVE GAS PERMEABILITY

[75] Inventors: Katsuharu Arisaka; Kazu Watanabe; Kunihiko Sasazima, all of Sakai, Japan

[73] Assignee: Daicel Ltd., Sakai, Japan

[21] Appl. No.: 760,225

[22] Filed: Jan. 17, 1977

Related U.S. Application Data

[63] Continuation-in-part of Ser. No. 725,509, Sep. 22, 1976, abandoned.

[30] Foreign Application Priority Data

Mar. 27, 1975 [JP] Japan .................................. 50-37295
Oct. 31, 1975 [JP] Japan ................................ 50-131984
Jan. 23, 1976 [JP] Japan .................................... 51-6860

[51] Int. Cl.² ......................... B05B 3/00; B29D 27/00
[52] U.S. Cl. .............................. 264/28; 210/500 M; 264/49; 264/177 F; 264/187; 264/209; 428/398
[58] Field of Search ................. 428/398; 264/41, 209, 264/182, 177 F, 207, 184, 187, 49, 28; 210/500 M

[56] References Cited

U.S. PATENT DOCUMENTS

| 3,674,628 | 7/1972 | Fabre ................................ 428/398 |
| 3,724,672 | 4/1973 | Leonard et al. ................. 264/177 F |
| 3,888,771 | 6/1975 | Isuge ...................................... 264/41 |
| 3,930,105 | 12/1975 | Christen et al. .................... 264/182 |
| 3,944,485 | 3/1976 | Rembaur et al. ............... 264/177 F |
| 3,975,478 | 8/1976 | Leonard ............................... 264/209 |
| 4,002,712 | 1/1977 | Hammer et al. .................... 264/209 |
| 4,035,459 | 7/1977 | Kesting ................................ 264/207 |

*Primary Examiner*—Jay H. Woo
*Attorney, Agent, or Firm*—Blanchard, Flynn, Thiel, Boutell & Tanis

[57] ABSTRACT

Asymmetric hollow fibers useful for effecting separations are prepared by spinning a solution of a fiber-forming cellulose derivative through the outer tube of a double tube-type spinneret into an aqueous coagulating bath to form a hollow fiber and simultaneously injecting an aqueous salt solution through the inner tube of the spinneret to contact the interior of the hollow fiber. The hollow fibers are dipped in warm water, then the free water is removed and the fibers are frozen and dried under vacuum.

8 Claims, 4 Drawing Figures

PROCESS FOR PREPARING HOLLOW FIBER HAVING SELECTIVE GAS PERMEABILITY

CROSS-REFERENCE TO RELATED APPLICATION

This application is a continuation-in-part of our co-pending application Ser. No. 725,509, filed Sept. 22, 1976, now abandoned and replaced by Ser. No. 883,232.

BACKGROUND OF THE INVENTION

Field of the Invention

The present invention relates to a membrane for separating gases, said membrane being composed of a cellulose fiber that possesses different permeabilities to different gases, and to a process for preparing that membrane.

More particularly, the present invention relates to a hollow fiber having a high gas permeation speed, a selective gas permeability and a high pressure resistance, a hollow fiber as aforesaid coated with a polymeric substance, and to processes for the preparation of such hollow fibers.

As gas-separating polymeric membranes, there are known a so-called homogeneous film, a porous film consisting of an entirely porous structure and a so-called asymmetric film comprised of a very thin homogeneous layer (0.3 to 0.7μ) present as a surface layer on a porous supporting layer. Membranes composed of a homogeneous film or an asymmetric film have the inherent selective permeability of the polymer of which the film is made. In membranes of this type, it is known that the gas permeation speed or gas permeability is generally proportional to the film area and the pressure and is inversely proportional to the film thickness (the thickness of the very thin homogeneous layer in case of the asymmetric film).

In the case of a porous film, the gas permeation speed is proportional to the reciprocal of the square root of the molecular weight of the gas, and it is much higher than that of the homogeneous film. According to our experiments, it has been found that the gas permeation speed of a porous film is $10^4$ to $10^7$ times the gas permeation speed of a homogeneous film.

In view of the foregoing, it is recognized that in order to perform gas separation effectively, it is necessary to increase the permeation area and the pressure difference and to reduce the film thickness, when a homogeneous film is employed.

When a planar permeation membrane is employed, in order to enable the membrane to withstand a high pressure it is necessary to increase the membrane thickness and to provide a porous supporting layer.

These requirements can be satisfied by using a hollow fiber including an asymmetric film. More specifically, a hollow fiber having a small diameter has a higher pressure resistance and provides a larger surface area in comparison with the same weight of a planar film. Further, if the thickness of the homogeneous portion of the asymmetric film is reduced, the permeation speed can be increased.

However, it is very difficult to prepare an asymmetric hollow fiber, and in connection with all polymeric substances, asymmetric hollow fibers having a good selective gas permeability have hardly been known in the art.

According to a first embodiment of Ser. No. 725,509 there is provided a membrane composed of a hollow fiber of a cellulose derivative, which fiber has a very high gas permeation speed and a separating capacity substantially in proportion to the reciprocal of the square root of the molecular weight of the gas, and a process for preparing such a fiber.

However, it has been found that it is difficult to separate a mixture of gases in which the difference of the molecular weights is small, into respective gases at a high efficiency by using this membrane.

According to a second embodiment of Ser. No. 725,509 is provided a hollow fiber as in the above-mentioned first embodiment which is coated on its surface with a very thin homogeneous polymer film having a high gas permeability, and a process for preparing same. The fiber of the second embodiment is unexpectedly superior to the fiber of the first embodiment because it can effect separation of a mixture of gases having similar molecular weights with high efficiency.

Various semi-permeable membranes having a two-layer structure are known in the art. For example, Japanese Patent Application Laid-Open Specification No. 62380/74 discloses a hollow fiber semi-permeable membrane having a good reverse osmosis capacity, which is made by the concentric sheath-core composite spinning method and which comprises a core of a polymer composition providing a porous structure and a sheath of a polymer composition providing a compact structure. According to this method, however, a complicated apparatus must be used, and it is expected that a high operation control will be required. Further, Japanese Patent Publication No. 17589/73 discloses a semi-permeable membrane having a two-layer structure which is formed by coating a polymer solution on a polyolefin film having dispersed therein a salt which is soluble in water or the like and then removing the soluble salt by extraction. This method is different from our method in the point that in this conventional method, if the sequence of the step of coating the polymer solution and the step of removing the soluble salt by extraction is reversed, clogging occurs in the porous structue and a fiber having the intended properties cannot be obtained. There is also known a method in which a thin film is crosslinked and coated on a porous film by plasma polymerization. In view of difficulties involved in the apparatus and operation of this process, it is considered that this method is lacking in practical utility.

We have discovered, according to the first embodiment of Ser. No. 725,509, a process in which hollow fibers having a selective gas permeability and possessing various additional properties can be obtained by a simple procedure.

According to the second embodiment of Ser. No. 725,509, we have discovered that an unexpectedly improved hollow fiber having a selective gas permeability can be prepared by coating a polymer solution having a prescribed concentration onto the hollow fiber of the first embodiment, by dipping or the like, as illustrated in the Examples given hereinafter.

More specifically, the first embodiment of Ser. No. 725,509 provides a process for preparing hollow fibers having a selective gas permeability which comprises the steps of dissolving a cellulose derivative in a solvent to form a solution having a solid content of 22 to 33% by weight, extruding said solution from the annular space between the concentric inner and outer tubes of a double tube-type spinneret and simultaneously feeding an aqueous liquid or a gas from the interior of the inner tube of said spinneret directly into an aqueous coagulating bath maintained at 0° to 45° C. to form a hollow fiber, dipping the hollow fiber in warm water maintained at 30° to 100° C. without drying, taking the hollow fiber out of the water bath, removing water from the hollow fiber inclusive of the water present in interior hollow portion, and immediately freeze-drying the hollow fiber under vacuum to obtain the fiber of the first embodiment of Ser. No. 725,509.

The fiber of the second embodiment of Ser. No. 725,509 is prepared by coating the exterior surface of the thus-obtained hollow fiber with a solution formed by dissolving a polymer in a solvent which is incapable of dissolving said cellulose derivative so that the solid (polymer) content of this coating solution is 0.2 to 5.0% by weight, thereby to form on the surface of the hollow fiber a homogeneous and thin coating film of the polymer, said coating film having a thickness of 0.1 to 300μ. The hollow fiber of the first embodiment of Ser. No. 725,509 prepared according to the above-described process, namely, a hollow fiber having a selective gas permeability consists essentially of an asymmetric hollow fiber of a cellulose derivative, said asymmetric hollow fiber (a) having an outer diameter of from 0.2 to 3 mm and an outer diameter/inner diameter ratio of from 1.1 to 3.0/1 and (b) having a nitrogen gas permeability of $5 \times 10^{-4}$ to 0.1 $(cm^3 (STP)/cm/^2.sec.cmHg)$, wherein its permeability to various gases is substantially in proportion to the reciprocal of the square roots of the molecular weights of the respective gases.

The hollow fiber of the second embodiment of Ser. No. 725,509 consists essentially of the hollow fiber of the first embodiment additionally coated on its exterior surface with a coating film of a polymer, said film having a thickness of from 0.1 to 300μ.

As the cellulose derivative that is used in Ser. No. 725,509, there can be mentioned, for example, cellulose acetate, cellulose acetate butyrate, cellulose propionate and ethyl cellulose. Acetone-soluble cellulose acetate is especially preferred.

Acetone alone or a mixture of acetone with one or more additional solvents such as, for example, dimethyl formamide, formamide, 2-methoxyethyl acetate, 1,4-dioxane or 1,3-dioxolan can be used for dissolving such cellulose derivative to form the starting solution for the extrusion step. In order to form fine pores, a swelling agent or an inorganic salt such as potassium hypochlorite may be added to the solvent. The use of an acetone-formamide mixed solvent or acetone-1,3-dioxane mixed solvent is preferred. A cellulose derivative such as mentioned above is dissolved in such solvent so that its concentration in the solution is from 22 to 33% by weight, which provides a viscosity of 300 to 1500 poises (measured at 20° C.) suitable for the formation of fibers. The solution is allowed to stand still to remove gases sufficiently. Then, the solution is fed quantitatively to the annular space between the concentric outer and inner tubes of a spinneret of a double tube structure by a gear pump, and simultaneously, an aqueous liquid compatible with the solvent of the solution, or an inert gas, is fed to the inner tube of the spinneret by a metering pump or the like, and thus, composite spinning of the solution, as the sheath, and the aqueous liquid or gas, as the core, is performed. In order to facilitate the spinning operation, it is necessary to maintain the viscosity of the solution within a certain range. If the viscosity is lower than 300 poises, the solution does not possess a fiber-forming property and because the extrudate is readily broken by a very slight change of the tension, it is impossible to conduct continuous spinning. If the viscosity of the solution is higher than 1500 poises, because the pressure of the spinning solution must be very high before it exits from the spinneret, it is difficult to feed the solution by an ordinary spinning gear pump, and because the extruded fiber cannot be drawn, it is impossible to conduct the spinning operation in a good condition.

BRIEF DESCRIPTION OF THE DRAWINGS

Referring now to FIG. 1 which illustrates a part of the process for preparing the hollow fiber, a cellulose acetate dope formed by dissolving cellulose acetate in a solvent and removing gas therefrom is fed to an outer tube 4 of a spinneret 3 from a tank 1 by a gear pump 2 and is spun into a coagulating bath 14. An aqueous liquid is fed into the central portion of the fiber from a tank 5 through an inner tube 7 of the spinneret by a metering pump 6 to form the core of the hollow fiber. In this step, a gas can be used instead of or together with the aqueous liquid. The spun and coagulated fiber 8 is wound on a bobbin 13 after passing around a guide 9. When a prescribed length of the fiber is wound on the bobbin, the fiber in the wet state is transferred to the next step of the warm water dipping treatment. Solvent-free water maintained at a prescribed temperature is supplied to the coagulating bath tank 10 from a supply coagulating water inlet 11, while a part of the coagulating liquid is discharged by a siphon 12 so that an increase of the solvent concentration is prevented.

Figure 1:
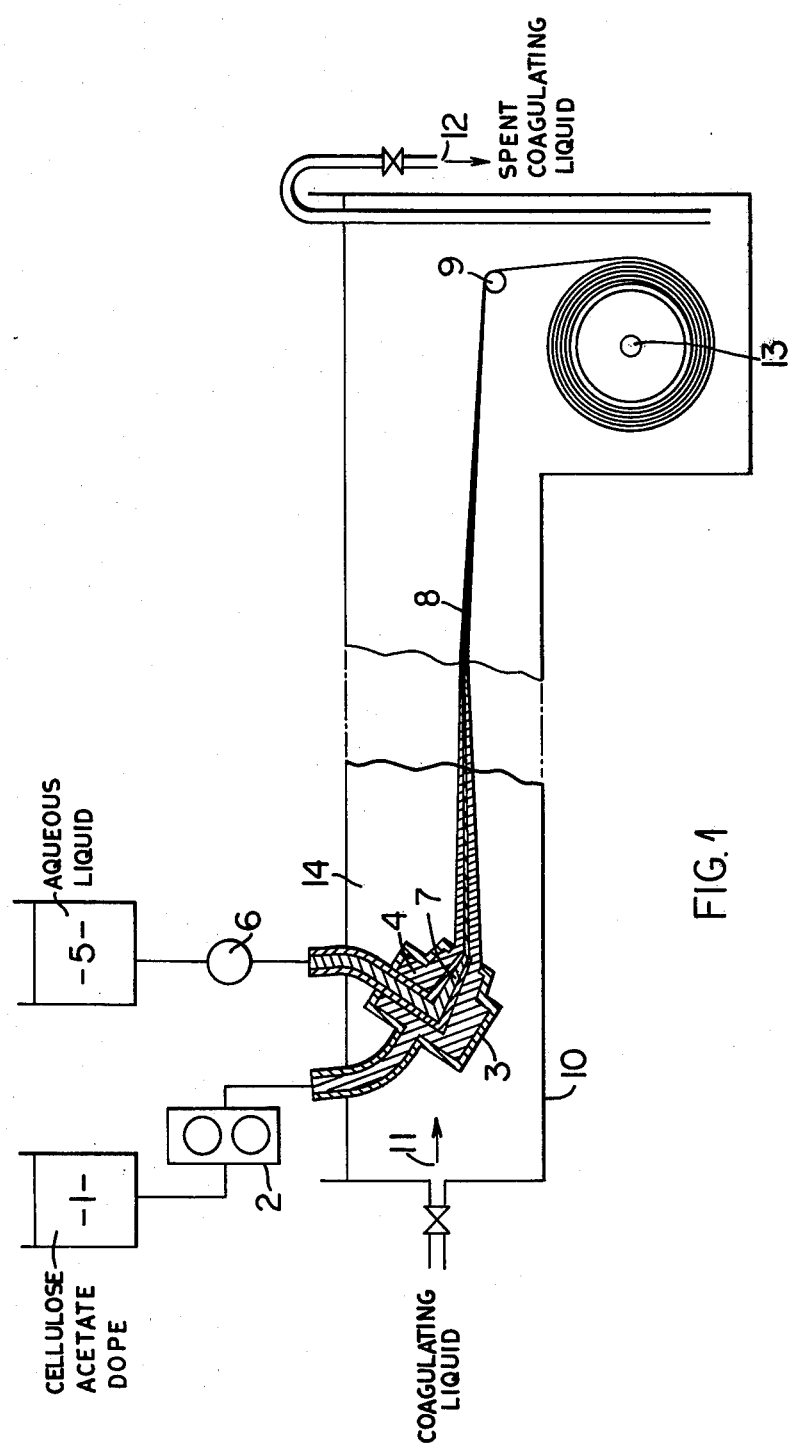
FIG. 1 is a diagrammatic illustration of a portion of the process.

As described above, the cellulose derivative solution (dope) is directly extruded into an aqueous coagulating solution to form a hollow fiber. In this point, the process of Ser. No. 725,509 is different from the majority of conventional methods in which the technique of extrusion into air is adopted.

In Ser. No. 725,509, especially good results are obtained with respect to the gas permeation speed when the spinneret is submerged in the aqueous coagulating bath, namely, the extruded fiber is not exposed to air, and the value of the gas permeation speed in this case is more than several hundred times greater than the values attainable according to the conventional methods.

The temperature of the cellulose derivative solution supplied to the spinneret can be a temperature approximating ambient temperature (15° to 30° C.), and the temperature of the aqueous coagulating solution into which the cellulose derivative solution is extruded is within the range of 0° to 45° C. When the temperature of the aqueous coagulating solution is higher than 50° C., the gas permeability of the resulting hollow fiber is reduced. Accordingly, in Ser. No. 725,509, it is preferred that the temperature of the aqueous coagulating solution be within a range of 0° to 45° C.

It is preferred that the temperature of the aqueous injection liquid extruded, as the core, from the inner tube of the double tube spinneret be higher than 0° C., and in general, temperatures approximating ambient temperature are employed. Hollow fibers differing in the ratio of inner diameter/outer diameter can be prepared by changing the amount of the aqueous injection liquid.

As pointed out hereinbefore, gases such as air and nitrogen can be injected instead of the aqueous injection liquid, under the same temperature conditions.

Both the injection liquid and the coagulating solution are composed mainly of water, and various acids, salts, bases or surface active agents can be incorporated if needed.

After the spun hollow fiber has been allowed to stand still in the coagulating solution for preferably at least 10 minutes, it is dipped in a bath of warm water maintained at 30° to 100° C. for at least 3 minutes, and it is then taken out from the water bath and water present on the outside and interior surfaces of the hollow fiber is removed by, for example, wiping away water present on the outside of the hollow fiber and blowing away water present in the interior of the hollow fiber by using high pressure air or nitrogen gas. Immediately thereafter, the hollow fiber is frozen and vacuum-dried. More specifically, the hollow fiber is dipped in a coolant cooled below −40° C. The coolant is a non-solvent for the cellulose derivative and is immiscible with water, for example, gasoline, fluorodichloromethane, pentane, cyclopentane, hexane or heptane. The hollow fiber is thereby frozen quickly, and the frozen hollow fiber is dried under a high vacuum of less than 0.5 mm Hg for more than 12 hours in a freeze-drier maintained below −30° C., preferably −35° C. Thus, there is obtained an asymmetric hollow fiber having an outer diameter of 0.2 to 3 mm and an outer diameter/inner diameter ratio of 1.1 to 3.0/1.0.

Properties of the gas-separating hollow fiber of Ser. No. 725,509 will now be described by reference to the hollow fiber obtained in Example 15 given hereinafter.

The outer diameter/inner diameter ratio is 1.14, and the nitrogen gas permeation speed is $3.53 \times 10^{-3}$ cc/cm$^2$.sec.cmHg. The nitrogen gas permeation speed of a prior art asymmetric cellulose acetate film is, for example, from $0.06 \times 10^{-5}$ to $0.31 \times 10^{-5}$ cc/cm$^2$.sec.mmHg as disclosed in Journal of Plastics, 24, 12, p. 19. Accordingly, it is seen that the hollow fiber of Ser. No. 725,509 has a nitrogen gas permeation speed at least several hundred times greater than the gas permeation speed of the conventional product according to the prior art. With respect to this hollow fiber, when gas permeation speeds for various gases are measured and their ratios to the nitrogen gas permeation speed, namely the separation coefficients, are calculated, it is found that the permeabilities of the hollow fiber of the present invention to various gases are substantially in proportion to the reciprocal of the square root of the molecular weight of the respective gases.

According to the second embodiment of the invention, a film of a film-forming polymer is coated on the exterior surface of the thus-prepared hollow fiber as the substrate. When the hollow fiber is composed of acetone-soluble cellulose acetate, a solution containing 0.2 to 5% by weight of a polymer such as a silicone polymer, a cellulose derivative (for example, ethyl cellulose), natural rubber, other polymeric compound, copolymers of polymer blends, optionally containing a plasticizer or other additive, is prepared by dissolving the polymer in a solvent having reduced dissolving and swelling properties with respect to the hollow fiber, preferably, pentane, gasoline, xylene, toluene or benzene. The hollow fiber, both ends of which are sealed so that the solution does not enter into the interior of the fiber, is dipped in the polymer solution or is coated with the polymer solution. After the dipping or coating treatment, the fiber is dried whereby to form on the external surface of the fiber a polymer coating film having a thickness of 0.1 to 300μ.

When the concentration of the polymer solution is less than 0.2% by weight, no improvement of the gas-separating capacity is attained by the coating treatment, as specifically illustrated hereinafter. If the concentration is higher than 5% by weight, the thickness of the film is too large and the gas permeability is reduced. If the thickness of the coating film is increased, the separation capacity is slightly improved, but this is not preferred from the practical viewpoint because the permeation speed is drastically lowered.

From the data of gas permeabilities of ethyl cellulose and silicone disclosed in "Handbook of Materials and Water Contents" compiled by Committee of Polymers and Hygroscopicity, Polymer Academy and published by Kyoritsu Shuppan, the gas permeation speeds of films of hollow fibers of the same shape prepared from these polymers are calculated, and the calculated values are compared with the gas permeation speeds of the coated hollow fibers of Ser. No. 725,509 to obtain results shown in Table 1. It is seen that in case of ethyl cellulose, the coated hollow fiber of Ser. No. 725,509 has a gas permeation speed about 50 times as high as the comparative sample and in case of silicone the coated hollow fiber of the present invention has a gas permeation speed 2 to 3 times as high as the gas permeation speed of the comparative sample. Based on the supposition that the gas permeation speed is controlled by the coated polymer, the thickness of the ethyl cellulose film and the thickness of the silicone film are calculated to be 1.8μ and 40μ, respectively.

Table 1

| | Comparison of Gas Permeation Speeds[1] | | | |
|---|---|---|---|---|
| Gas | Ethyl Cellulose-Coated Hollow Fiber | Ethyl Cellulose Homogeneous Film[2] (hollow fiber) | Silicone-Coated Hollow Fiber | Silicone Homogeneous Film[2] (hollow fiber) |
| $H_2$ | $7.77 \times 10^{-5}$ | $2.60 \times 10^{-7}$ | — | — |
| $N_2$ | $3.53 \times 10^{-6}$ | $6.6 \times 10^{-8}$ | — | — |
| $O_2$ | $1.18 \times 10^{-5}$ | $2.15 \times 10^{-7}$ | $1.34 \times 10^{-5}$ | $5.30 \times 10^{-6}$ |
| $CO_2$ | $8.82 \times 10^{-5}$ | $4.10 \times 10^{-7}$ | $7.04 \times 10^{-5}$ | $2.87 \times 10^{-5}$ |

Notes
[1]The unit of the gas permeation speed is cm$^3$/cm$^2$ . sec . cmHg.
[2]Calculated on the supposition that the film thickness is 0.1 mm.

In the preparation of aqueous reverse osmosis membranes, it is known to use an aqueous solution of sodium chloride as an aqueous coagulating medium to form voids, and the results of experiments made on applications of this known technique using an aqueous solution of sodium chloride as the aqueous coagulating medium for improving the rupture strength in hollow fiber membranes for aqueous reverse osmosis have been reported (see D. S. Cleveland, M. Rambean, A Czernicki and T. R. Rich; Evaluation of Asymmetric Hollow Fibers for Desalination by Reverse Osmosis, U.S.

Dept., Interior Office of Saline Water, Research and Development Progress Report No. 856 (1973)).

According to the present invention, we discovered that the gas separation capacity of the fibers described in Ser. No. 725,509 is improved by using an aqueous solution of various water-soluble salts, such as sodium chloride, instead of water, as the injection medium fed to the central opening of the hollow fibers during spinning of the fibers. By this procedure a compact layer also is formed on the interior surface of the hollow fiber whereby the hollow fiber has compact layers including capillary vessels on both the outer and the inner surfaces of the hollow fiber.

As the cellulose derivative that can be used in the present invention, there can be mentioned, for example, cellulose acetate, cellulose acetate butyrate, cellulose propionate and ethyl cellulose. Use of acetone-soluble cellulose acetate is especially preferred.

Acetone alone can be used as the solvent for dissolving the cellulose derivative, but mixtures of acetone with other solvents such as dimethylformamide, formamide, 2-methoxyethyl acetate, 1,4-dioxane and 1,3-dioxolan can also be employed. In order to form fine voids, a swelling agent or an inorganic salt such as potassium hypochlorite can be incorporated into such solvent. An acetone-formamide mixture is preferred as the mixed solvent. The cellulose derivative is dissolved in such solvent to form a solution having a concentration of 22 to 33% by weight which provides a viscosity suitable for the formation of fibers, namely, 300 to 1500 poises as measured at 20° C.

The solution is fed to the outer tube portion of a spinneret of the double tube structure at a fixed rate by a gear pump after sufficient defoaming by standing, and simultaneously, an aqueous injection liquid miscible with the above-mentioned solvent is fed to the inner tube of the spinneret by a gear pump and is extruded therefrom together with the spinning dope to effect spinning. The spinneret is immersed in water maintained at 0° to 30° C. Simultaneously with the extrusion of the spinning dope from the spinneret, the outer surface of the extrudate contacts the water and is coagulated while the solvent in the dope is extracted therefrom. Since the osmotic pressure is enhanced by dissolving the salt into the injection liquid that is injected into the hollow core of the fiber, diffusion of the solvent from the inner wall of the fiber is delayed and also the speed of diffusion of water in the injection liquid into the interior of the fiber is reduced, whereby a compact layer is formed on the inner surface of the hollow fiber. From the results of numerous experiments, it was found that the salt concentration in the injection liquid must be from 1 to 20% by weight, preferably 4 to 20% by weight, especially preferably 5 to 10% by weight. As the salt that is used in the present invention, there can be mentioned, for example, inorganic salts such as sodium chloride, $Na_2CO_3$, $Na_2SO_4$ and $KH_2PO_4$ and organic acid salts such as $CH_3COONa$.

The thus-spun hollow fibers are maintained immersed in the coagulating liquid for at least 20 minutes and then they are immersed in warm water maintained at 50° to 100° C. for at least 3 minutes to replace the injection liquid present in the hollow core thereof by pure water and to dissolve out any solvent, such as acetone, remaining in the fiber wall. Then, the free water present as a film or droplets on the inside and the outside of the fiber is removed by suitable means such as blowing out by compressed air. Then, the fibers are dipped in a cooling medium (a non-solvent for the cellulose derivative and also insoluble in water, for example, gasoline, fluorodichloromethane, cyclopentane and hexane) cooled below −40° C. without drying to rapidly cool the fibers and freeze the water contained in fine voids of the fibers, and in this state, the frozen fibers are placed in a vacuum freeze drier cooled below −20° C., preferably below −35° C., and allowed to stand under high vacuum of 0.5 mm Hg or lower for at least 12 hours to sublimate fine crystals of water and thereby form fine voids in the fibers, whereby the hollow fibers of the present invention are prepared.

It was found that the thus-prepared hollow fibers have a much higher mixed gas separation capacity than hollow fibers formed by using water as the injection liquid, even though the gas permeation speed is lowered to 1/10 to 1/100.

The present invention will now be further described in detail by reference to the following illustrative Examples, in which all references to "%" are percent by weight.

EXAMPLE 1 AND COMPARATIVE EXAMPLES 1–4 OF SER. NO. 725,509

A solution (dope) consisting of 26% by weight of cellulose acetate (Eastman Kodak's E 400-25), 49% by weight of acetone and 25% by weight of formamide was subjected to spinning and hot water immersion under the conditions specified in Table 1 by using the apparatus of FIG. 1, followed by immersion in gasoline cooled to −50° C. for quick freezing the fiber and then vacuum drying the fiber at −40° C. and 0.01 mmHg for 24 hours. The nitrogen gas permeability of the obtained dry hollow fibers was measured by placing the fiber in a pressure container, introducing pure nitrogen gas into the vessel externally of the fiber and measuring the flow rate of the nitrogen gas that permeates into the hollow portion to determine gas permeability. The outer and inner diameters of the obtained hollow fibers are also shown in Table 2.

Table 2

|  | Spinning rate (m/min) | Spinneret position | Injected water temperature (° C) | Immersing treatment water temperature (° C) | Fiber diameter (mm) | | $N_2$ permeation rate |
| --- | --- | --- | --- | --- | --- | --- | --- |
|  |  |  |  |  | Outer diameter | Inner diameter |  |
| Example 1 | 10 | Under water | 20 | 70 | 0.86 | 0.65 | $2.04 \times 10^{-3}$ |
| Comparative Example |  | Distance above water surface |  |  |  |  |  |
| 1 | 10 | 30cm | 2 | 70 | 0.84 | 0.35 | $0.82 \times 10^{-6}$ |
| 2 | 10 | 15 | 2 | 60 | 0.99 | 0.68 | $1.52 \times 10^{-6}$ |
| 3 | 12 | 30 | 20 | 60 | 0.96 | 0.77 | $2.60 \times 10^{-6}$ |

Table 2-continued

| Spinning rate (m/min) | Spinneret position | Injected water temperature (°C) | Immersing treatment water temperature (°C) | Fiber diameter (mm) Outer diameter | Fiber diameter (mm) Inner diameter | $N_2$ permeation rate |
|---|---|---|---|---|---|---|
| 4 | 10 | 15 | 20 | 60 | 0.87 | 0.48 | 6.07 × 10$^{-6}$ |

Note:
Coagulating liquid (water) temperature 20° C
Spinneret outer bore: 1mm; outer diameter of inner tube: 0.3mm
Units of $N_2$ permeation rate: cc/cm$^2$ . sec . cmHg The permeation rates of various kinds of gases were measured for the respective fibers obtained in Example 1 and Comparative Example 4, and the ratio of such permeation rate of each gas to that of nitrogen, that is, the separation factor, was determined. The results are shown in Table 3. The film remained free of any damage in each case even when the gas feed pressure at the time of measurement of the gas permeation rate was raised to 10 kg/cm$^2$. This shows the existence of a linear relationship between permeability and feed pressure.

Table 3

| Specimen | Separation Factor $H_2/N_2$ | $He/N_2$ | $O_2/N_2$ | $Ar/N_2$ |
|---|---|---|---|---|
| Comparative Example 4 | 4.40 | 4.20 | 0.960 | 0.813 |
| Example 1 | 3.40 | 2.40 | 0.916 | 0.854 |
| Theoretical Value (Note) | 3.74 | 2.64 | 0.935 | 0.837 |

(Note)
"Theoretical value" is the ratio of the reciprocals of the square roots of the molecular weights of the respective gases.

Figure 2:
FIGS. 2, 3 and 4 are scanning electron microscopic photographs (magnification: 10,000 ×) of the hollow fibers of Comparative Examples 1 and 4 and Example 1, respectively).
Figure 3:
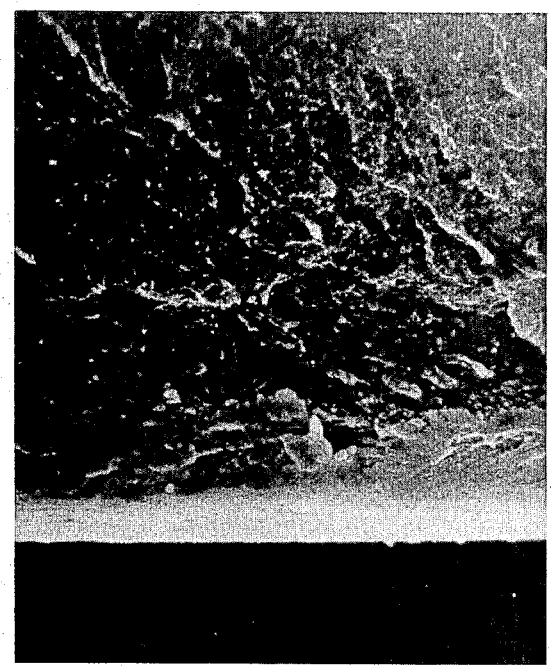
Figure 4:

The scanning electron microscopic photographs (magnification: 10,000X) of sections of the hollow fibers obtained in Comparative Examples 1 and 4 and Example 1 are shown in FIGS. 2, 3 and 4, respectively. It is noted from these photographs that the dense layer A of the external surface, which is considered to perform the separating action, is thicker in the order of FIG. 2, FIG. 3 and FIG. 4, and that the structure of the porous layer B supporting such dense layer to maintain the mechanical strength becomes better in porosity and pore uniformity correspondingly.

EXAMPLES 2-6 AND COMPARATIVE EXAMPLE 5 OF SER. NO. 725,509

24% by weight of cellulose acetate (Daicel's RO-CA 5430, acetylation degree 54%, viscosity 30 sec), 51% by weight of acetone and 25% by weight of 1,4-dioxane were mixed well, and after dissolving, filtration and deaeration, the mixture was subjected to spinning at the rate of 13.5m/min by extruding the mixture along with injected water having a temperature of 20° C. from a spinneret immersed in water at 5° C. as a coagulating liquid (water) by using the apparatus of FIG. 1. This was followed by immersion for 15 minutes in water having the temperature shown in Table 3 and then vacuum drying in the same way as described in Example 1. The diameters and gas permeability of the obtained dry hollow fibers are shown in Table 4.

Table 4

| | Water temperature for heat treatment (°C) | Fiber diameter (mm) Outer diameter | Fiber diameter (mm) Inner diameter | $N_2$ permeating rate | $Ar/N_2$ separation factor |
|---|---|---|---|---|---|
| Comparative Example 5 | 20 | 0.85 | 0.65 | 0.24 × 10$^{-3}$ | 0.85 |
| Example 2 | 50 | 0.75 | 0.57 | 1.21 × 10$^{-3}$ | 0.90 |
| Example 3 | 60 | 0.72 | 0.55 | 2.40 × 10$^{-3}$ | 0.91 |
| Example 4 | 70 | 0.80 | 0.61 | 3.45 × 10$^{-3}$ | 0.87 |
| Example 5 | 80 | 0.75 | 0.57 | 4.96 × 10$^{-3}$ | 0.86 |
| Example 6 | 90 | 0.78 | 0.60 | 4.57 × 10$^{-3}$ | 0.89 |

EXAMPLES 7-9 AND COMPARATIVE EXAMPLE 6 OF SER. NO. 725,509

A spinning dope prepared in the same way as described in Example 1 was subjected to spinning at the rate of 14.8 m/min from the outer tube of a double-tube spinneret immersed in a coagulating liquid (water) having the temperature shown in Table 4 while forcing out the injected water of 20° C. from the inner tube. Each obtained product was then immersed in 70° C. hot water for 10 minutes, removing the water present on both the interior and exterior of the fibers and then immersing the fibers in −60° C. gasoline for quick freezing. Then the product was put into a vacuum dryer cooled to −40° C. and dried therein at 0.02 mmHg for 48 hours. The gas permeability of each of the obtained dry fibers was measured by passing nitrogen and argon gas therethrough to determine the separation factor $Ar/N_2$. The results are shown in Table 5.

Table 5

| | Coagulating liquid temperature | Fiber diameter (mm) Outer diameter | Fiber diameter (mm) Inner diameter | $N_2$ permeating rate | $Ar/N_2$ separation factor |
|---|---|---|---|---|---|
| Example 7 | 1° C | 0.77 | 0.59 | 3.58 × 10$^{-3}$ | 0.85 |
| 8 | 30 | 0.91 | 0.70 | 3.92 × 10$^{-3}$ | 0.83 |
| 9 | 40 | 0.80 | 0.62 | 1.34 × 10$^{-3}$ | 0.88 |
| Comparative Example 6 | 50 | 0.83 | 0.64 | 0.17 × 10$^{-3}$ | 0.85 |

EXAMPLES 10 AND 11 OF SER. NO. 725,509

The same spinning dope as used in Example 1 was spun in the same way except that the amount of injected water was changed to obtain hollow fibers with different inner and outer diameter ratios. After immersion in 70° C. hot water for more than 10 minutes and removal of water from both the interior and exterior of the fibers, the obtained fibers were further immersed in −55° C. pentane for 2 minutes for quick freezing. The thus treated fiber mass was then put into a −40° C. vacuum dryer and dried therein at 0.01 mmHg for 24 hours. The gas permeability of the resultant dry fibers was measured by using $N_2$ and Ar gas to determine the separation factor $Ar/N_2$. The results are shown in Table 6.

Table 6

| | Fiber diameter (mm) | | Outer diameter/ Inner diameter | $N_2$ permeating rate | $Ar/N_2$ |
|---|---|---|---|---|---|
| | Outer diameter | Inner diameter | | | |
| Example 10 | 0.84 | 0.65 | 1.29 | $2.00 \times 10^{-3}$ | 0.83 |
| Example 11 | 0.87 | 0.40 | 2.04 | $1.57 \times 10^{-3}$ | 0.88 |

(Note)
Spinning rate; 10.5m/min (constant)
Spinneret position; underwater (constant)
Injected water temperature; 5° C (constant)
Coagulating liquid (water) temperature; 5° C (constant)

EXAMPLES 12 AND 13 OF SER. NO. 725,509

18% by weight of cellulose acetate (Daicel's RO-CA 5430, acetylation degree 54%, viscosity 30 sec.), 6% by weight of cellulose acetate propionate (Eastman Kodak's EAP-482-20), 44% by weight of acetone, 21% by weight of 1,4-dioxane, and 11% by weight of a 10% aqueous solution of magnesium perchlorate were mixed well, and after dissolving, filtration and deaeration, the mixture was subjected to spinning at the rate of 135 m/min, with the injected water being at a temperature of 5° C. and the coagulation bath temperature being 3° C. and with the spinneret immersed in water, by using the apparatus of FIG. 1. The obtained products were then immersed in water at 70° C. for 10 minutes, followed by freezing and drying under the conditions specified in the following table, and then the gas permeability of each obtained fiber was measured. The results are shown in Table 7. Some products of Example 13 had wide variations in performance and could not be put to practical use.

tained product was immersed in water of 70° C., then further immersed in −55° C. gasoline for 2 minutes and then put into a −40° C. vacuum dryer for drying therein under vacuum of 0.5 mmHg for 24 hours. The gas permeability of the thus-obtained dry film was measured. The results are as shown in Table 8.

Table 8

| Spinning rate | Fiber diameter (mm) | | $N_2$ gas permeating rate | $Ar/N_2$ separation factor |
|---|---|---|---|---|
| | Outer diameter | Inner diameter | | |
| 17m/min | 0.78 | 0.56 | $1.88 \times 10^{-3}$ | 0.85 |

(Note)
Spinneret position; underwater
Coagulation liquid (water) temperature; 5° C

EXAMPLE 15 OF SER. NO. 725,509

A solution (dope) comprising 26% by weight of cellulose acetate (E 400-25 manufactured by Eastman Kodak), 49% by weight of acetone and 25% by weight of formamide was spun at a spinning speed of 15 m/min in the apparatus shown in FIG. 1 through a spinneret having an internal diameter of the outer tube of 1 mm immersed in water maintained at 2° C., while water at 20° C. was injected through the inner tube of the spinneret, which inner tube had an outer diameter of 0.3 mm. The extrudate was immersed in warm water maintained at 70° C. for 15 minutes without drying, and the extrudate was then taken out of the water bath and the water on the exterior and in the interior of the fiber was removed. Immediately, the hollow extrudate was dipped in gasoline maintained at −60° C. to freeze it quickly and then the fiber was vacuum-dried at −40° C. and 0.01 mm Hg for 12 hours. The resulting hollow fiber had an outer diameter of 0.8 mm and an outer diameter/inner diameter ratio of 1.14. The nitrogen gas permeation speed of the hollow fiber was $3.53 \times 10^{-3}$ cm³ (STP)/cm²·sec·cmHg. Then, ethyl cellulose (N-50 or N-100 manufactured by Hercules) was coated on the hollow fiber. More specifically, ethyl cellulose was dissolved in xylene at a concentration indicated in Table 9, and the hollow fiber having both its ends sealed was dipped in the solution and then dried. The gas permea- Table 7

| | Quick freezing | | Vacuum drying | | | $N_2$ gas permeation rate | |
|---|---|---|---|---|---|---|---|
| | Temperature | Time | Temperature | Degree of vacuum | Time | Average | Standard deviation |
| Example 12 | −50° C | 2 minutes | −40° C | 0.1mmHg | 24 hours | $2.72 \times 10^{-3}$ | $0.11 \times 10^{-3}$ |
| 13 | −50° C | 2 minutes | −25° C | 0.1mmHg | 12 hours | $0.51 \times 10^{-3}$ | $0.43 \times 10^{-3}$ |

EXAMPLE 14 OF SER. NO. 725,509

20% by weight of cellulose acetate (Eastman Kodak's E-425), 6% by weight of cellulose acetate butyrate (Eastman Kodak's EAB-500), 49% by weight of acetone and 25% by weight of formamide were mixed well, dissolved and deaerated to obtain a solution (spinning dope), and this solution was subjected to spinning by injecting air at 20° C., instead of water, into the inner tube 7 of the double-tube spinneret of FIG. 1. The obbility of the resulting coated hollow fiber was measured by placing the sample in a pressure vessel, introducing a pure gas into the vessel externally of the fiber, removing from the hollow portion the gas that permeated through the fiber and measuring the amount of the permeating gas by using a flow meter. The results obtained are shown in Table 9. The gas permeabilities of the cellulose acetate hollow fiber before coating are also shown in Table 9.

Table 9

Gas Permeation Rates of Ethyl Cellulose-Coated Hollow Fibers

| Gas | Cellulose Acetate Hollow Fiber | | Ethyl cellulose N-50 | | | | | | Ethyl cellulose N-100 | |
|---|---|---|---|---|---|---|---|---|---|---|
| | | | 1.00% | | 1.50% | | 2.00% | | 1.5% | |
| | AG[1] | α[2] | AG | α | AG | α | AG | α | AG | α |
| $N_2$ | $3.53 \times 10^{-3}$ | 1 | $2.95 \times 10^{-6}$ | 1 | $1.28 \times 10^{-6}$ | 1 | $1.28 \times 10^{-6}$ | 1 | $1.11 \times 10^{-6}$ | 1 |

Table 9-continued

| | Cellulose Acetate Hollow Fiber | | Gas Permeation Rates of Ethyl Cellulose-Coated Hollow Fibers | | | | | | Ethyl cellulose N-100 | |
|---|---|---|---|---|---|---|---|---|---|---|
| | | | Ethyl cellulose N-50 | | | | | | | |
| | | | 1.00% | | 1.50% | | 2.00% | | 1.5% | |
| Gas | AG[1)] | α[2)] | AG | α | AG | α | AG | α | AG | α |
| $H_2$ | $1.01\times10^{-2}$ | 2.86 | $4.80\times10^{-5}$ | 16.3 | $2.86\times10^{-5}$ | 22.3 | $2.68\times10^{-5}$ | 21.0 | $2.92\times10^{-5}$ | 26.2 |
| He | $7.11\times10^{-3}$ | 2.01 | $5.63\times10^{-5}$ | 19.1 | $2.68\times10^{-5}$ | 20.9 | $2.64\times10^{-5}$ | 20.7 | $2.49\times10^{-5}$ | 22.3 |
| $O_2$ | $3.17\times10^{-3}$ | 0.899 | $8.70\times10^{-6}$ | 2.95 | $4.70\times10^{-6}$ | 3.67 | $5.34\times10^{-6}$ | 4.18 | $4.01\times10^{-6}$ | 3.61 |
| Ar | $2.73\times10^{-3}$ | 0.776 | $1.01\times10^{-5}$ | 3.45 | $2.64\times10^{-6}$ | 2.06 | $4.74\times10^{-6}$ | 3.71 | $2.26\times10^{-6}$ | 2.03 |
| $CO_2$ | $2.62\times10^{-3}$ | 0.743 | $4.88\times10^{-5}$ | 16.6 | $3.43\times10^{-5}$ | 26.8 | $3.11\times10^{-5}$ | 24.3 | $2.84\times10^{-5}$ | 25.5 |
| $CH_4$ | $3.64\times10^{-3}$ | 1.03 | $3.21\times10^{-6}$ | 1.09 | $2.93\times10^{-6}$ | 2.29 | $1.49\times10^{-6}$ | 1.16 | $1.64\times10^{-6}$ | 1.48 |
| $C_3H_6$ | $2.61\times10^{-3}$ | 0.739 | $1.07\times10^{-5}$ | 3.63 | $9.39\times10^{-6}$ | 7.33 | $2.04\times10^{-5}$ | 16.0 | $1.04\times10^{-5}$ | 9.37 |

Notes
AG: The gas permeation rate, $cm^3/cm^2 \cdot sec \cdot cmHg$.
α: The separation coefficient of each gas to $N_2$, which is expressed by the formula of α = AG gas/AG $N_2$, wherein "AG gas" is the permeation rate of the gas and "AG $N_2$" is the permeation rate of $N_2$.

EXAMPLE 16 OF SER. NO. 725,509

The cellulose acetate hollow fiber used in Example 15 was coated by using 102 RTV, 103 RTV, Primer U, KR-251 or KR-255 (manufactured by Shinetsu Chemicals) as the silicone.

In the case of 102 RTV and 103 RTV, 0.5% of Cat-RH and 5% of Cat-103 were added as the catalyst, respectively, and the mixtures were dissolved in xylene at the concentrations indicated in Table 10.

Primer U was used directly in the commercially available form, and KR-251 and KR-255 were dissolved in xylene at concentrations indicated in Table 10.

Cellulose acetate hollow fibers prepared in the same manner as described in Example 15 were dipped in these solutions and dried, and the gas permeability was determined in the same manner as in Example 15. The results shown in Table 10 were obtained.

Table 11

| | Gas Permeabilities of Natural Rubber-Coated Hollow Fiber | |
|---|---|---|
| | Natural Rubber, 1.0% | |
| Gas | AG | α |
| $N_2$ | $3.46\times10^{-6}$ | 1 |
| $H_2$ | $2.72\times10^{-5}$ | 7.89 |
| He | $2.49\times10^{-5}$ | 7.19 |
| $O_2$ | $5.01\times10^{-6}$ | 1.45 |
| Ar | $3.79\times10^{-6}$ | 1.10 |
| $CO_2$ | $1.72\times10^{-5}$ | 4.98 |
| $CH_4$ | $2.82\times10^{-6}$ | 0.77 |
| $C_3H_6$ | $9.05\times10^{-6}$ | 2.47 |

Note
AG and α are as defined in "Notes" of Table 9.

EXAMPLE 18 OF SER. NO. 725,509

Ethyl cellulose (N-60 manufactured by Hercules) was dissolved in xylene at a concentration of 0.1% or 0.2%, and in the same manner as in Example 15, cellulose hollow fibers were immersed in the thus obtained solutions from 1 to 3 times. The gas permeabilities of the resulting coated hollow fibers were measured to obtain results shown in Table 12.

The gas permeabilities of the coated hollow fiber obtained by dipping the hollow fiber in a 3% solution of ethyl cellulose are also shown in Table 12.

Table 10

| | Gas Permeabilities of Silicone-Coated Hollow Fibers | | | | | | | | | |
|---|---|---|---|---|---|---|---|---|---|---|
| | 102 RTV | | | | 103 RTV | | | | | |
| | 2.00% | | 3.00% | | 1.00% | | 2.00% | | Primer U | |
| Gas | AG | α | AG | α | AG | α | AG | α | AG | α |
| $N_2$ | $6.88\times10^{-6}$ | 1 | $3.38\times10^{-6}$ | 1 | $6.72\times10^{-6}$ | 1 | $2.20\times10^{-6}$ | 1 | $1.39\times10^{-6}$ | 1 |
| $H_2$ | $4.62\times10^{-5}$ | 6.72 | $2.40\times10^{-5}$ | 7.11 | $3.28\times10^{-5}$ | 4.87 | $1.12\times10^{-5}$ | 5.11 | — | — |
| He | $3.79\times10^{-5}$ | 5.51 | $1.84\times10^{-5}$ | 5.45 | $2.61\times10^{-5}$ | 3.87 | $8.38\times10^{-6}$ | 3.81 | — | — |
| $O_2$ | $1.38\times10^{-5}$ | 2.01 | $8.87\times10^{-6}$ | 2.62 | $1.34\times10^{-5}$ | 2.00 | $6.03\times10^{-6}$ | 2.74 | $5.01\times10^{-6}$ | 3.59 |
| Ar | $1.28\times10^{-5}$ | 1.86 | $7.08\times10^{-6}$ | 2.09 | $1.14\times10^{-5}$ | 1.70 | $5.45\times10^{-6}$ | 2.48 | — | — |
| $CO_2$ | $6.71\times10^{-5}$ | 9.75 | $6.62\times10^{-5}$ | 19.6 | $7.04\times10^{-5}$ | 10.5 | $3.70\times10^{-5}$ | 16.8 | — | — |
| $CH_4$ | $1.53\times10^{-5}$ | 2.23 | $1.06\times10^{-5}$ | 3.13 | $1.09\times10^{-5}$ | 1.61 | $6.58\times10^{-6}$ | 2.99 | — | — |
| $C_3H_6$ | $6.60\times10^{-5}$ | 9.60 | $5.61\times10^{-5}$ | 16.6 | $1.32\times10^{-4}$ | 19.6 | $7.93\times10^{-5}$ | 36.1 | — | — |

| | KR-251 | | | | KR-255 | | | | | |
|---|---|---|---|---|---|---|---|---|---|---|
| | 2.00% | | 5.00% | | 2.00% | | 5.00% | | 10.0% | |
| Gas | AG | α | AG | α | AG | α | AG | α | AG | α |
| $N_2$ | $5.72\times10^{-6}$ | 1 | $6.18\times10^{-7}$ | 1 | $1.18\times10^{-6}$ | 1 | $6.29\times10^{-7}$ | 1 | $3.87\times10^{-7}$ | 1 |
| $H_2$ | $7.44\times10^{-5}$ | 13.0 | $2.01\times10^{-5}$ | 32.5 | $3.15\times10^{-5}$ | 26.7 | $1.73\times10^{-5}$ | 27.5 | $1.25\times10^{-5}$ | 32.4 |
| He | $8.35\times10^{-5}$ | 14.6 | $2.30\times10^{-5}$ | 37.2 | $3.50\times10^{-5}$ | 29.7 | $1.82\times10^{-5}$ | 28.9 | $1.27\times10^{-5}$ | 32.7 |
| $O_2$ | $9.32\times10^{-6}$ | 1.63 | $2.47\times10^{-6}$ | 3.99 | $3.58\times10^{-6}$ | 3.03 | $1.96\times10^{-6}$ | 3.12 | $2.42\times10^{-6}$ | 6.26 |
| Ar | $8.41\times10^{-6}$ | 1.47 | $1.36\times10^{-6}$ | 2.20 | $2.70\times10^{-6}$ | 2.29 | $1.13\times10^{-6}$ | 1.79 | $1.80\times10^{-6}$ | 4.61 |
| $CO_2$ | $4.08\times10^{-5}$ | 7.13 | $1.30\times10^{-5}$ | 21.0 | $1.95\times10^{-5}$ | 16.5 | $1.06\times10^{-5}$ | 16.9 | $8.24\times10^{-6}$ | 21.3 |
| $CH_4$ | — | — | $7.17\times10^{-7}$ | 1.16 | $1.65\times10^{-6}$ | 1.40 | $1.06\times10^{-6}$ | 1.69 | $6.23\times10^{-7}$ | 1.61 |
| $C_3H_6$ | $9.32\times10^{-6}$ | 1.63 | $2.43\times10^{-6}$ | 3.93 | $2.29\times10^{-6}$ | 1.94 | $1.74\times10^{-6}$ | 2.76 | $3.30\times10^{-6}$ | 7.83 |

Note
The units of AG and calculation method of α are the same as described in "Notes" of Table 9.

EXAMPLE 17 OF SER. NO. 725,509

Natural rubber was dissolved in xylene at a concentration of 1.00% and the solution was coated on a cellulose acetate fiber prepared in the same manner as described in Example 15. The gas permeability was determined to obtain results shown in Table 11.

Table 12

Gas Permeation Rates of Coated Hollow Fibers Formed by Dipping in
Low Concentration Ethyl Cellulose Solutions Several Times

| | Ethyl Cellulose N-50, 0.2% | | Ethyl Cellulose N-50, 0.1% | | | | | | Ethyl Cellulose N-50, 3.0% | |
|---|---|---|---|---|---|---|---|---|---|---|
| | One dip | | one dip | | two dips | | three dips | | one dip | |
| Gas | AG | α | AG | α | AG | α | AG | α | AG | α |
| $N_2$ | $7.11 \times 10^{-5}$ | 1 | $3.07 \times 10^{-4}$ | 1 | $2.80 \times 10^{-5}$ | 1 | $2.88 \times 10^{-6}$ | 1 | $9.64 \times 10^{-7}$ | 1 |
| He | $2.42 \times 10^{-4}$ | 3.40 | $6.13 \times 10^{-4}$ | 2.00 | — | — | — | — | $2.29 \times 10^{-5}$ | 23.8 |
| $O_2$ | $7.59 \times 10^{-5}$ | 1.07 | $2.49 \times 10^{-4}$ | 0.811 | $3.32 \times 10^{-5}$ | 1.18 | $6.38 \times 10^{-6}$ | 2.21 | $4.63 \times 10^{-6}$ | 4.80 |
| Ar | $5.14 \times 10^{-5}$ | 0.723 | $2.16 \times 10^{-4}$ | 0.704 | — | — | — | — | $4.35 \times 10^{-6}$ | 4.51 |
| $CO_2$ | $9.37 \times 10^{-5}$ | 1.32 | $4.35 \times 10^{-4}$ | 1.45 | — | — | — | — | $2.75 \times 10^{-5}$ | 28.5 |

EXAMPLES 19–22 ACCORDING TO THE INVENTION AND COMPARATIVE EXAMPLE 7

A mixture comprising 23% by weight of cellulose acetate (RO-CA5430 manufactured by Daicel, Degree of acetylation = 54%, viscosity = 30 seconds), 52% by weight of acetone and 25% by weight of 1,4-dioxane was thoroughly blended to form a solution, and the solution was filtered, defoamed and injected into an outer tube of a spinneret of the double tube structure by means of a gear pump. Simultaneously, an aqueous solution containing sodium chloride at a concentration of 1 to 20% was fed to the inner tube of the spinneret by a metering pump. Both the solutions were extruded into a coagulating liquid (water) maintained at 3° C. and the extrudate was wound at a rate of 12 m/min in the water. Then, the extrudate was allowed to stand in the coagulating liquid (water) for at least 30 minutes, during which time one end of the extruded fiber was hung down from the vessel to permit the liquid in the hollow core to flow out by capillary action, whereby to replace the aqueous solution of sodium chloride in the hollow core by pure water. Then, the fiber was dipped in water maintained at 80° C. for 15 minutes and then free water was removed from the outside and inside of the fiber. Then, the fiber was immersed in gasoline maintained at −50° C. to rapidly freeze the fiber and the fiber was then placed in a vacuum drier maintained at −40° C. and 0.01 mm Hg for 24 hours to effect vacuum drying. The thus-obtained dry hollow fiber membrane was placed in a pressure vessel and a gaseous mixture comprised of 99 vol.% of nitrogen and 1 vol.% of krypton was flowed into the vessel under a pressure of 5 Kg/cm². In this state, the permeated gas was sampled from the hollow core of the hollow fiber at prescribed time intervals and the volume ratio $K_1$ of nitrogen/krypton was determined by gas chromatogram. The volume ratio $K_0$ of nitrogen/krypton in the starting gas was similarly determined and the degree R of separation of krypton from nitrogen was calculated from the following equation:

$$R = \frac{K_1}{K_0} \qquad (1)$$

The flow rate of the permeated gas from the hollow portion was measured when the sample gas was collected. The results obtained are shown in Table 1.

Table 1

| | Amount of Salt in Injection Water | Fiber Diameter (mm) | | $N_2$ Permeation Speed* | Degree R of Separation of Krypton |
|---|---|---|---|---|---|
| | | outer diameter | inner diameter | | |
| Comparative Example 7 | sodium chloride, 0 wt.% | 0.85 | 0.65 | $2.40 \times 10^{-4}$ | 0.89 |
| Example 19 | sodium chloride, 1 wt.% | 0.86 | 0.65 | $1.32 \times 10^{-4}$ | 0.88 |
| Example 20 | sodium chloride, 3 wt.% | 0.84 | 0.63 | $0.61 \times 10^{-4}$ | 0.87 |
| Example 21 | sodium chloride, 5 wt.% | 0.85 | 0.65 | $0.15 \times 10^{-4}$ | 0.74 |
| Example 22 | sodium chloride, 20 wt.% | 0.84 | 0.62 | $0.019 \times 10^{-4}$ | 0.75 |

Note
*: unit of permeation speed = cc/cm².sec.cmHg

When the sodium chloride concentration was higher than 20%, reduction of the permeation speed was extreme and the resulting fibers had no practical utility.

EXAMPLES 23 TO 26

Spinning was carried out in the same manner as described in Examples 18 to 22 except that a solution obtained by dissolving sodium sulfate, sodium carbonate, acidic sodium phosphate or sodium acetate in water at a concentration of 5% by weight, instead of sodium chloride, was used as the aqueous injection liquid fed into the hollow core. Post treatments were conducted in the same manner as described in Examples 18 to 22 to obtain hollow fibers, and the gas permeability and the krypton separation degree were determined. The results obtained are shown in Table 2.

Table 2

| Ex. No. | Kind of Salt | Fiber Diameter (mm) | | $N_2$ Permeation Speed | Krypton Separation Degree R |
|---|---|---|---|---|---|
| | | outer diameter | inner diameter | | |
| 23 | $Na_2SO_4$ | 0.87 | 0.60 | $1.24 \times 10^{-4}$ | 0.82 |
| 24 | $KH_2PO_4$ | 0.85 | 0.59 | $0.71 \times 10^{-4}$ | 0.79 |
| 25 | $Na_2CO_3$ | 0.86 | 0.61 | $0.18 \times 10^{-4}$ | 0.86 |
| 26 | $CH_3COONa$ | 0.84 | 0.60 | $0.49 \times 10^{-4}$ | 0.80 |

The embodiments of the invention in which an exclusive property or privilege is claimed are defined as follows:

1. A process for preparing a hollow, asymmetric, gas-separating fiber which comprises extruding through the annular space between the inner and outer tubes of a double tube spinneret, a solution containing from about 22 to about 33 percent by weight of a fiber-forming cellulose ester or a fiber-forming cellulose ether dissolved in an organic solvent and having a viscosity of from about 300 to about 1500 poise at a temperature of 20° C. and simultaneously extruding through the inner tube of said spinneret water containing dissolved therein from one to 20 weight percent of a water-soluble salt, said spinneret being submerged in an aqueous coagulating liquid bath having a temperature of from 0° to 30° C. whereby to coagulate said solution directly in said bath to produce a hollow fiber; maintaining the fiber in said coagulating bath for at least about 20 minutes; then removing the fiber from said coagulating bath and then, without permitting said fiber to dry, immersing it in water having a temperature of 50° to 100° C. for at least 3 minutes; then removing free water present on the exterior and interior surfaces of said fiber; then applying to the fiber a liquid coolant having a temperature of below minus 40° C. to freeze the fiber, said coolant being a non-solvent for said cellulose ether or said cellulose ester and being immiscible with water; and then vacuum drying the fiber under a pressure of less than 0.5 mmHg absolute, for more than 12 hours at a temperature of below minus 30° C.

2. A process as claimed in claim 1 in which the solute in said solution is a cellulose ester selected from the group consisting of cellulose acetate, cellulose acetate butyrate and cellulose propionate.

3. A process as claimed in claim 1 in which the solute in said solution consists of acetone-soluble cellulose acetate.

4. A process as claimed in claim 1 in which the solute in said solution consists of ethyl cellulose.

5. A process as claimed in claim 1 in which said organic solvent is acetone or a mixture of acetone and one or more substances selected from the group consisting of dimethyl formamide, formamide, 2-methoxyethyl acetate, 1,4-dioxane and 1,3-dioxolane.

6. A process as claimed in claim 1 in which said water-soluble salt is selected from the group consisting of NaCl, $Na_2SO_4$, $KH_2PO_4$, $Na_2CO_3$ and $CH_3COONa$.

7. A process as claimed in claim 6 in which the amount of said water-soluble salt is 4 to 20 weight percent.

8. A process as claimed in claim 6 in which the amount of said water-soluble salt is 5 to 10 weight percent.

* * * * *